(12) United States Patent
Belz et al.

(10) Patent No.: US 9,219,989 B2
(45) Date of Patent: Dec. 22, 2015

(54) SYSTEM AND METHOD FOR SHARING LOCATION INFORMATION

(71) Applicant: AT&T Intellectual Property I, L.P., Atlanta, GA (US)

(72) Inventors: Steven M. Belz, Cedar Park, TX (US); Jeffrey Brandt, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/091,785

(22) Filed: Nov. 27, 2013

(65) Prior Publication Data

US 2014/0080516 A1 Mar. 20, 2014

Related U.S. Application Data

(63) Continuation of application No. 12/175,718, filed on Jul. 18, 2008, now Pat. No. 8,634,855.

(51) Int. Cl.
*H04W 4/02* (2009.01)
*G01S 5/00* (2006.01)
*G01S 5/10* (2006.01)
*H04W 64/00* (2009.01)

(52) U.S. Cl.
CPC ............. *H04W 4/025* (2013.01); *G01S 5/0063* (2013.01); *G01S 5/10* (2013.01); *H04W 64/00* (2013.01); *H04W 64/003* (2013.01)

(58) Field of Classification Search
CPC ....... H04W 4/00; H04W 4/025; H04W 64/00; H04W 64/003; H04W 4/008
USPC .......... 455/456.1–456.6, 404.1, 404.2, 414.1, 455/432.1, 437
See application file for complete search history.

(56) References Cited

U.S. PATENT DOCUMENTS

| | | | |
|---|---|---|---|
| 2003/0060213 A1* | 3/2003 | Heinonen et al. | 455/456 |
| 2007/0004428 A1* | 1/2007 | Morgan et al. | 455/456.1 |
| 2007/0149211 A1* | 6/2007 | Dunn et al. | 455/456.1 |
| 2007/0202888 A1 | 8/2007 | Brachet et al. | |
| 2009/0210148 A1* | 8/2009 | Jayanthi | 701/206 |

* cited by examiner

*Primary Examiner* — Michael Faragalla
(74) *Attorney, Agent, or Firm* — Toler Law Group, PC

(57) ABSTRACT

In a particular embodiment, a method includes requesting, at a first communication device, location information from multiple communication devices. The method also includes recording, at the first communication device, a particular location coordinate received from a closest communication device of the multiple communication devices. The method further includes adjusting the particular location coordinate based on triangulation data associated with the closest communication device.

20 Claims, 3 Drawing Sheets

SYSTEM AND METHOD FOR SHARING LOCATION INFORMATION

CLAIM OF PRIORITY

This application is a continuation of and claims priority from U.S. patent application Ser. No. 12/175,718, filed Jul. 18, 2008, and entitled "SYSTEM AND METHOD FOR SHARING LOCATION INFORMATION," which is hereby incorporated by reference in its entirety.

FIELD OF THE DISCLOSURE

The present disclosure relates generally to location information sharing techniques and more specifically to a system and method for sharing location information.

BACKGROUND

Location services are a popular feature used by consumers for a variety of reasons including navigation and searching for facilities of interest such as retail stores, gas stations, restaurants, and so on. Technology to perform location services such as a global positioning system detector can be expensive.

DETAILED DESCRIPTION

One embodiment of the present disclosure entails a portable communication device having a controller to request location information from one or more non-portable wireless access points, receive one or more location coordinates from the one or more non-portable wireless access points, determine which of the one or more non-portable wireless access points is closest to the portable communication device according to one or more wireless signals generated by the one or more non-portable wireless access points, and record the location coordinate supplied by the closest non-portable wireless access point. Each of the one or more non-portable wireless access points can determine its location coordinate with a location receiver.

Another embodiment of the present disclosure entails a non-portable wireless access point having a controller to determine a location coordinate of the non-portable wireless access point with a location receiver, receive a request from a portable communication device for the location coordinate, and transmit the location coordinate to the portable communication device. The portable communication device can record the supplied location coordinate responsive to detecting from a wireless signal transmitted by the non-portable wireless access point that the non-portable wireless access point is closest to the portable communication device relative to one or more other non-portable wireless access points.

Yet another embodiment of the present disclosure entails a method involving a non-location aware communication device determining its location from a determination of a closest one of one or more location-aware communication devices sharing location information with the non-location aware communication device.

Figure 1:
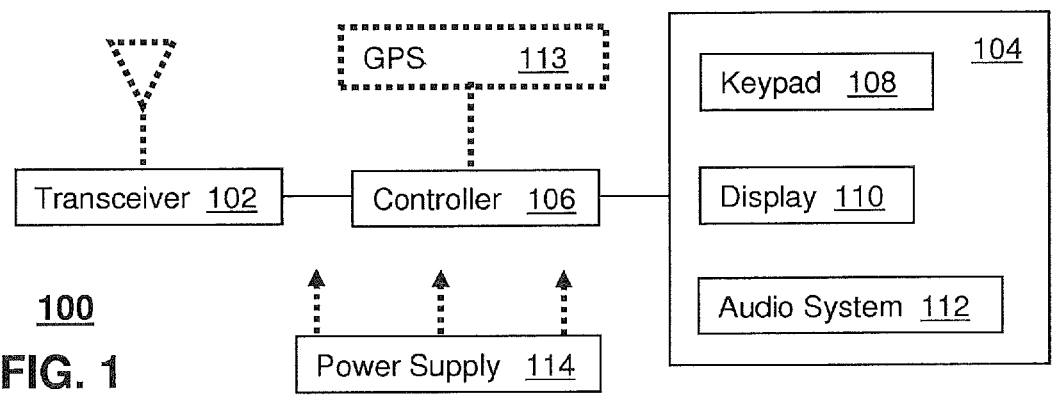
FIG. 1 depicts an illustrative embodiment of a communication device.

FIG. 1 depicts an illustrative embodiment of a communication device 100. The communication device 100 can comprise a wireline or wireless transceiver 102 (herein transceiver 102), a global positioning system (GPS) receiver 113, a user interface (UI) 104, a power supply 114, and a controller 106 for managing operations thereof. The transceiver 102 can utilize common wireless access technologies such as cellular, software defined radio (SDR) and/or WiMAX technologies, among others. Cellular technologies can include, for example, CDMA-1X, UMTS/HSDPA, GSM/GPRS, TDMA/EDGE, EV/DO, as well as next generation technologies as they arise. In another illustrative embodiment, the transceiver 102 can support short-range wireless access technologies such as Bluetooth, WiFi, or cordless technologies such as Digital Enhanced Cordless Telecommunications (DECT) or Personal Handyphone System (PHS). In yet another illustrative embodiment the transceiver 102 can support wireline technologies such as a Public Switched Telephone Network (PSTN), VoIP or Internet Protocol Multimedia Subsystem (IMS) communications.

The UI 104 can include a depressible or touch-sensitive keypad 108 with a navigation mechanism (e.g., a roller ball, a joy stick, or mouse) for manipulating operations of the communication device 100. The UI 104 can further include a display 110 such as monochrome or color LCD (Liquid Crystal Display) for conveying images to the end user of the communication device 100. In an embodiment where the display 110 is touch-sensitive, a portion of the keypad 108 can be presented by way of the display. The UI 104 can also include an audio system 112 that utilizes common audio technology for conveying private audio (e.g., audio heard only in the proximity of a human ear) and high audio (e.g., speakerphone for hands free operation). The audio system 112 can further include a microphone for intercepting audible signals of an end user.

The power supply 114 can utilize common power management technologies such as replaceable batteries, supply regulation technologies, and charging system technologies for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other storage technologies.

A location-aware communication device 100 can utilize the GPS receiver 113 for tracking the whereabouts of the communication device 100. The GPS receiver 113 can be used for providing location services such as navigation and/or facility searching features (e.g., "find the nearest gas station"). Communication devices 100 that do not have a location receiver such as a GPS receiver 113 are considered by the present disclosure as non-location aware communication devices.

The communication device 100 of FIG. 1 can represent a computing device such as a laptop computer, a desktop computer, a server, a mobile phone (e.g., cell phone), a short-range mobility phone (e.g., a cordless or wired office or home phone), or a set-top box operatively coupled to a media communication system such as a cable TV communication system, a satellite TV communication system, or an Internet Protocol TV communication system.

In another representative embodiment, the communication device 100 can represent a portable communication device. In the present context a portable communication device can mean a communication device that utilizes a portable battery system and which is able to communicate with a multiplicity of access points of a communication network as it moves from place to place. Additionally, in this embodiment the portable communication device can operates as a location-aware portable communication device or non-location aware portable communication device. The latter results from the portable communication device not having a location receiver such as GPS 113, while the former portable communication device includes or has access to a location receiver.

In yet another representative embodiment, the communication device 100 can represent a non-portable communication device. In this embodiment, the non-portable communication device can represent a communication device that needs to be tethered to a power source, thereby limiting its mobility. Non-portable wireless access points can be a representative embodiment of a non-portable communication device. Non-portable wireless access points can be representative of cellular base stations operating according to a common cellular communications protocol such as described above, a WiMAX base station, a WiFi base station, a cordless phone base station (e.g., DECT), a Bluetooth base station, and so on. It should be further mentioned that in some instances the non-portable wireless access points may not include a user interface such as the UI 104 depicted in FIG. 1. In this embodiment, a user can remotely communicate with the non-portable wireless access point by way of an Internet Protocol connection (wireline or wireless) over a public data network. In this environment, the user can browse a configuration of the non-portable wireless access point utilizing a common browser (e.g., Microsoft Explorer) and monitor and/or configure the access point as desired.

Figure 2:
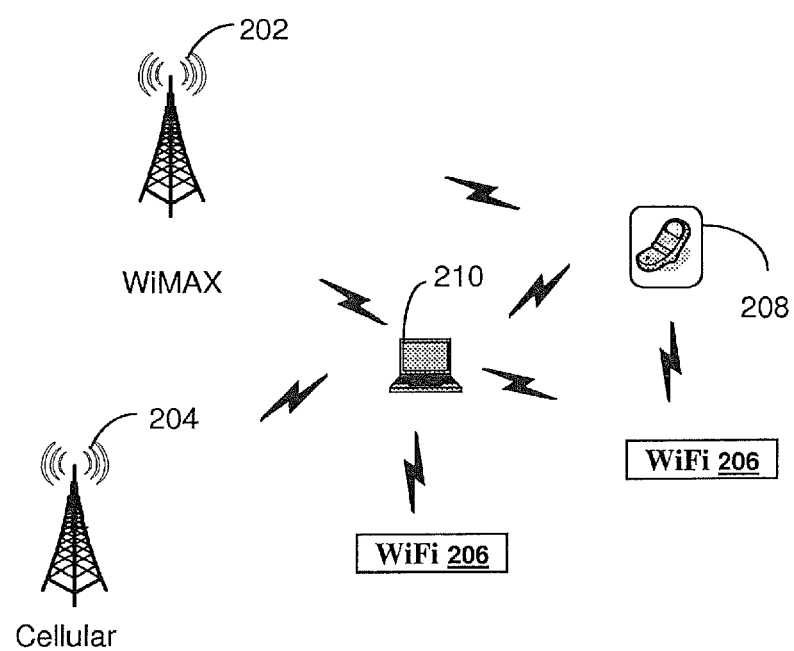
FIG. 2 depicts an illustrative embodiment of a communication system in which the communication device of FIG. 1 operates.

FIG. 2 depicts an illustrative embodiment of a communication system 200 in which the communication device 100 can operate. The communication system 200 can comprise a number of communication devices some of which are portable, and others which are non-portable. Some of the communication devices can represent portable communication devices such as laptop computer 210 and mobile phone (or personal digital assistant) 208. The non-portable communication devices can represent non-portable wireless access points such as a WiMAX base station 202, a cellular base station 204, or WiFi access points 206. The portable communication devices 208 and 210 can support more than one communication protocol such as GSM, GPRS, WiFi, and WiMAX. Moreover, some of the communication devices represented by references 202-210 can be non-location aware (i.e., do not have access to a location receiver to detect its location) while others are location-aware communication devices.

Figure 3:
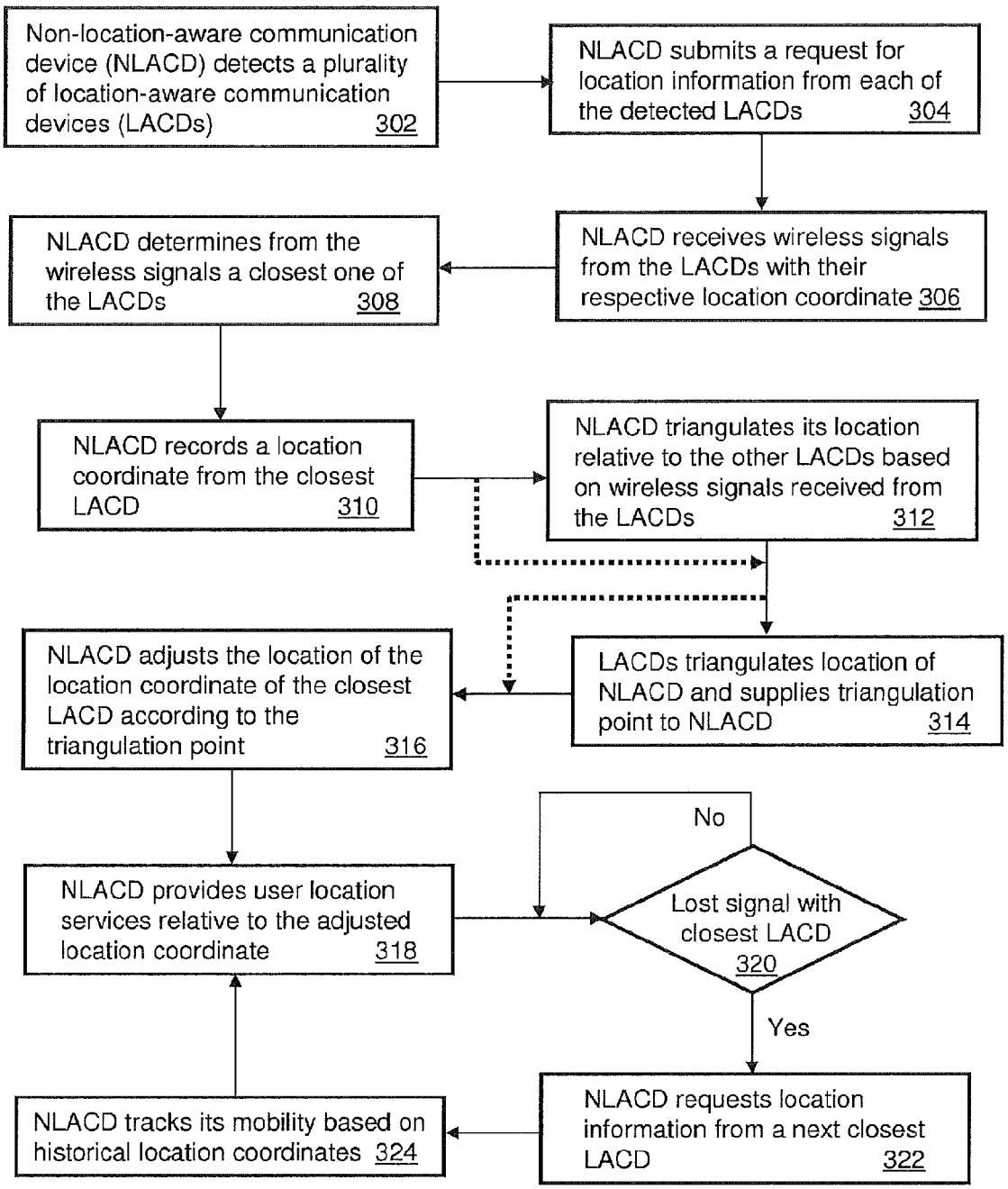
FIG. 3 depicts an illustrative method operating in the communication system of FIG. 2.

Method 300 depicted in FIG. 3 can be applied to communication system 200 to enable non-location aware communication devices 100 to offer its users location services. Method 300 can begin with step 302 in which a non-location aware communication device (NLACD) detects a plurality of location-aware communication devices (LACDs). For illustrative purposes, it will be assumed that communication devices with references 208 and 210 are NLACDs (i.e., communication devices without access to a location detection resource such as GPS receiver 113), while communication devices with references 202-206 are LACDs, each having access to a location detection resource.

Step 302 can be representative of an NLACD (e.g., mobile phone 208) having multi-mode communication resources to detect and communicate with the WiMAX base station 202, the cellular base station 204, and/or one or both of the WiFi access points 206. Responsive to detecting a plurality of LACDs, the NLACD can transmit in step 304 a request for location information to each of the detected LACDs. In step 306 the NLACD can receive wireless signals from each of the LACDs with a location coordinate of each LACD. The location coordinate can be a longitude and latitude coordinate and/or a street address. In the former, the NLACD can translate the longitude and latitude coordinate to a street address by accessing a local map stored in the NLACD or by accessing a map resource over an Internet connection supplied by one of the LACDs (e.g., by way of one of the WiFi access points 206).

From the wireless signals transmitted by the LACDs, the NLACD can also determine in step 308 a closest one of the LACDs. This step can be accomplished by common means such as by employing the resources of the transceiver 102 and the controller 106 to measure a received signal strength (also commonly referred to as RSS), a time of arrival (TOA), or an angle of arrival (AOA) of the wireless signals. From any one of these common measurements (and combinations thereof), the NLACD can estimate a distance between the NLACD and each of the LACDs. From these distance calculations, the NLACD can estimate the closest LACD to the NLACD. The measurements of step 308 can be employed over several rounds of wireless signals exchanged between the NLACD and the LACDs, thereby improving a probability and accuracy of an estimated distance between the NLACD and the LACDs.

Once the closest LACD is detected, the NLACD records the location coordinate supplied thereby in step 310. To improve the accuracy of the location of the NLACD, the NLACD can also triangulate its location relative to the other LACDs utilizing the distance and angles measured from wireless signals received from the LACDs. Alternatively, or in combination, the LACDs can be programmed to triangulate the location of the NLACD relative to the LACDs. The triangulation technique employed by the NLACD or the LACDs can be the same or similar to a technique employed by cellular base stations today to triangulate a location of a mobile phone.

With the triangulated location determined in step 312 by the NLACD or supplied by one of the LACDs in step 314, the NLACD can adjust in step 316 the location coordinate supplied by the closest LACD. The adjustment can offset the longitude and/or latitude so that it more accurately pin points the location of the NLACD relative to the closest LACD. Once the adjustment is made, the NLACD can provide its user location services relative to the adjusted location coordinate. For instance, the user can communication over an Internet link of a WiFi access point 206 with a location service to determine the closest restaurant relative to the adjusted location coordinate of step 316. Additionally, the location services can provide the user step-by-step map instructions to direct the user to said restaurant.

While the NLACD is wirelessly connected to the closest LACD (or is able to detect its presence), the NLACD can continue to offer its user location services relative to the adjusted location coordinate in step 318. If the NLACD detects in step 320 that it has lost signal detection with the closest LACD, the NLACD can proceed to step 322 to request location information from a next closest LACD (using the techniques described earlier for steps 302-316). In step 324 the NLACD can track its mobility from a collection of historical location coordinates recorded from prior adjusted location coordinates recorded by the NLACD. The NLACD can again provide the user location services in step 318 utilizing the new adjusted location coordinate determined in step 322.

From the foregoing descriptions, it would be evident to an artisan with ordinary skill in the art that the aforementioned embodiments can be modified, reduced, or enhanced without departing from the scope of the present disclosure. For example, method 300 can be adapted so that once non-location aware communication devices become aware of their location they act as location-aware communication devices. In this illustrative embodiment, a non-location aware communication device that becomes a location-aware communication device can perform the task of sharing its location coordinate with other non-location aware communication devices. The non-location aware communication devices can determine the closest location aware communication device according to the steps of method 300 described above.

In yet another illustrative embodiment, method 300 can be adapted so that location-aware portable communication devices can share location information with non-location aware portable communication devices. For example, location-aware mobile phones can share their location with non-location aware mobile phones. This sharing process can take place between mobile phones with WiFi, Bluetooth or other common wireless access technologies. The non-location aware mobile phone can determine which of the location-aware mobile phones is closest to it using the aforementioned techniques and select the location coordinate of the closest location-aware mobile phone.

In yet another illustrative embodiment, the method 300 can be adapted so that the non-location aware communication device records the location coordinate of the closest location-aware communication device without adjusting said coordinate. Accordingly, steps 312-318 can be removed from FIG. 3 without altering the scope of the present disclosure.

Other suitable modifications can be applied to the present disclosure. Accordingly, the reader is directed to the claims for a fuller understanding of the scope of the present disclosure.

Figure 4:
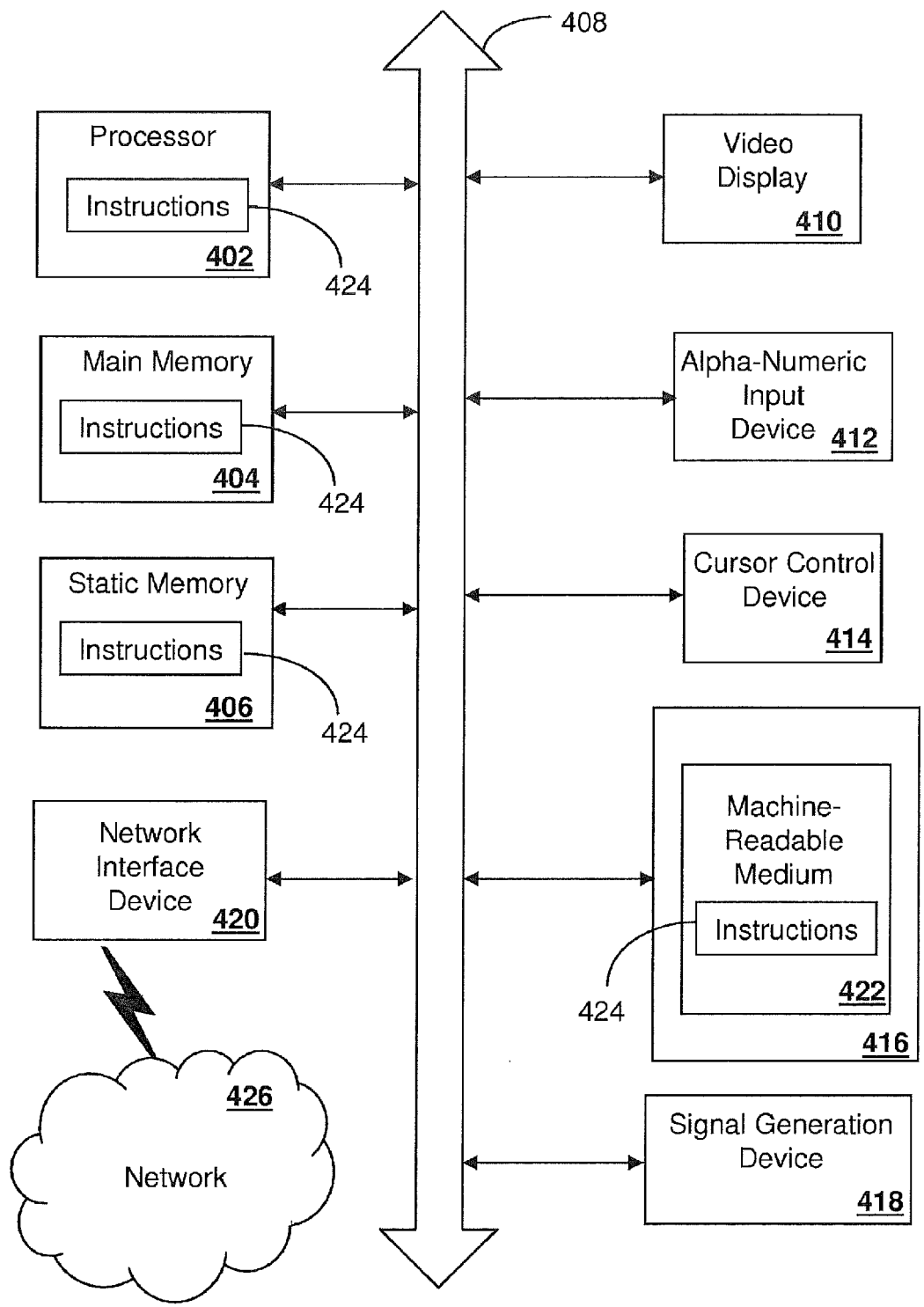
FIG. 4 depicts an illustrative diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    sending, from a first communication device, requests for location information to multiple communication devices in a transmission range of the first communication device, wherein the location information for a particular communication device of the multiple communication devices includes a location coordinate for the particular communication device;
    receiving the location information from responding communication devices of the multiple communication devices in response to the requests;
    determining, at the first communication device, a second communication device of the responding communication devices that is closest to the first communication device;
    recording, at the first communication device, a particular location coordinate received from the second communication device; and
    adjusting the particular location coordinate based on triangulation data determined by the first communication device from the location information, wherein adjusting the particular location coordinate includes modifying the particular location coordinate from a first value to a second value.

2. The method of claim 1, wherein, after adjustment, the particular location coordinate corresponds to a location of the first communication device.

3. The method of claim 1, further comprising:
    receiving second triangulation data from communication devices of the multiple communication devices; and
    adjusting the particular location coordinate based on the second triangulation data.

4. The method of claim 1, further comprising:
    receiving, at the first communication device, second triangulation data from a communication device of the multiple communication devices; and
    adjusting the particular location coordinate based on the second triangulation data.

5. The method of claim 4, wherein the second triangulation data is received from the second communication device.

6. The method of claim 5, wherein the second triangulation data includes a triangulation point, the triangulation point determined based on a distance between the first communication device and the second communication device, an angle of arrival associated with a wireless signal received by the second communication device from the first communication device, or a combination thereof.

7. The method of claim 1, wherein the first communication device is a non-location aware communication device, and wherein the multiple communication devices are location aware communication devices.

8. The method of claim 1, further comprising requesting a second location coordinate from a next closest communication device of the multiple communication devices in response to a determination that the first communication device is unable to communicate with the second communication device.

9. The method of claim 1, further comprising measuring a signal characteristic corresponding to each wireless signal received from the responding communication devices.

10. The method of claim 9, wherein determining the second communication device is based on the signal characteristic corresponding to each wireless signal.

11. The method of claim 9, wherein the signal characteristic includes a received signal strength, a time of arrival, an angle of arrival, or a combination thereof.

12. The method of claim 1, further comprising, after adjusting the particular location coordinate, sending the particular location coordinate to a device as a location of the first communication device.

13. A communication device comprising:
    a controller;

a transmitter coupled to the controller; and a memory coupled to the controller, wherein the memory stores instructions that are executable by the controller to perform operations comprising:

sending requests via the transmitter for location information to multiple communication devices in a transmission range of the transmitter, wherein the location information for a particular communication device of the multiple communication devices includes a location coordinate for the particular communication device;

receiving the location information from responding communication devices of the multiple communication devices in response to the requests;

determining a second communication device of the responding communication devices that is closest to the communication device;

recording a particular location coordinate supplied by the second communication device in the memory;

determining triangulation information from location coordinates supplied by two other communication devices of the responding communication devices; and adjusting the particular location coordinate based on the triangulation information.

14. The communication device of claim 13, wherein the second communication device comprises a non-location aware communication device and wherein the second communication device stores the particular location coordinate.

15. The communication device of claim 13, wherein the particular location coordinate comprises a longitude and a latitude.

16. The communication device of claim 15, wherein the operations further comprise accessing a map to convert the longitude and the latitude into a street address, and wherein the map is stored in the memory or is accessible via a network.

17. A computer-readable storage device storing instructions that, when executed by a processor of a first communication device, cause the processor to perform operations comprising:

requesting location information from multiple communication devices in a transmission range of the first communication device, wherein the location information for a particular communication device of the multiple communication devices includes a location coordinate for the particular communication device;

receiving the location information from responding communication devices of the multiple communication devices;

determining a second communication device of the responding communication devices that is closest to the first communication device;

recording a particular location coordinate received from the second communication device of the multiple communication devices; and adjusting the particular location coordinate based on triangulation data determined from the location information.

18. The computer-readable storage device of claim 17, wherein the operations further comprise classifying the particular location coordinate as potentially invalid in response to being unable to communicate with the second communication device.

19. The computer-readable storage device of claim 17, wherein the operations further comprise generating a mobility history based on multiple location coordinates received from the multiple communication devices during a time period.

20. The computer-readable storage device of claim 17, wherein the operations further comprise, in response to being unable to communicate with the second communication device, requesting a second location coordinate from a next closest communication device of the multiple communication devices.

* * * * *